United States Patent
Yoshigasaki et al.

(10) Patent No.: US 11,371,583 B2
(45) Date of Patent: Jun. 28, 2022

(54) SPEED REDUCTION MECHANISM

(71) Applicant: HONDA MOTOR CO., LTD., Tokyo (JP)

(72) Inventors: Tsuyoshi Yoshigasaki, Wako (JP); Kenta Kohigashi, Wako (JP); Naoki Matsunaga, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 82 days.

(21) Appl. No.: 16/937,690

(22) Filed: Jul. 24, 2020

(65) Prior Publication Data
US 2020/0355243 A1 Nov. 12, 2020

Related U.S. Application Data

(63) Continuation of application No. PCT/JP2018/043662, filed on Nov. 28, 2018.

(30) Foreign Application Priority Data

Feb. 14, 2018 (JP) .............................. JP2018-024320

(51) Int. Cl.
*F16H 1/20* (2006.01)
*F16H 57/02* (2012.01)

(52) U.S. Cl.
CPC .............. *F16H 1/206* (2013.01); *F16H 1/20* (2013.01); *F16H 2057/02008* (2013.01)

(58) Field of Classification Search
CPC ... F16H 1/06; F16H 1/20; F16H 1/206; F16H 2057/02008

USPC .......................................................... 74/413
See application file for complete search history.

(56) References Cited

U.S. PATENT DOCUMENTS

| 1,064,736 | A | * | 6/1913 | James | F16H 1/20 74/421 A |
| 2,936,644 | A | * | 5/1960 | Miller | F16H 3/02 74/421 R |
| 3,011,358 | A | * | 12/1961 | Moore | F16H 57/12 74/409 |
| RE25,960 | E | * | 2/1966 | Caley | F16H 57/02 74/421 R |
| 3,410,148 | A | * | 11/1968 | Clarke | F16H 3/02 74/331 |

(Continued)

FOREIGN PATENT DOCUMENTS

| CN | 103671734 A | * | 3/2014 |
| JP | 6-137421 A | | 5/1994 |

(Continued)

OTHER PUBLICATIONS

International Search Report dated Feb. 19, 2019, issued in counterpart International Application No. PCT/JP2018/043662 (2 pages).

*Primary Examiner* — Joseph Brown
(74) *Attorney, Agent, or Firm* — WHDA, LLP

(57) ABSTRACT

A speed reduction mechanism comprises an output shaft and a plurality of gears. The output shaft is arranged on the same axis as an input shaft. The plurality of gears transmit a driving force input to the input shaft to the output shaft. The plurality of gears include an input gear provided on the input shaft, an output gear provided on the output shaft, and a plurality of transmission gears arranged side by side in a circumferential direction of the input shaft.

5 Claims, 5 Drawing Sheets

(56) References Cited

U.S. PATENT DOCUMENTS 4,709,590 A * 12/1987 Richards ................ F16H 1/206
  74/331
5,356,347 A    10/1994 Komura et al.
5,412,948 A     5/1995 Komura et al.

FOREIGN PATENT DOCUMENTS

| JP | 2003-14057 A | 1/2003 |
| JP | 2006-337206 A | 12/2006 |
| JP | 2008-39096 A | 2/2008 |
| JP | 2014-200458 A | 10/2014 |

* cited by examiner

SPEED REDUCTION MECHANISM

CROSS-REFERENCE TO RELATED APPLICATION

This application is a continuation of International Patent Application No. PCT/JP2018/043662 filed on Nov. 28, 2018, which claims priority to and the benefit of Japanese Patent Application No. 2018-024320 filed on Feb. 14, 2018, the entire disclosures of which are incorporated herein by reference.

BACKGROUND OF THE INVENTION

Field of the Invention

The present invention relates to a speed reduction mechanism.

Description of the Related Art

As a driving transmission mechanism used in a working machine or the like, a hydro-static transmission (HST) is known (for example, Japanese Patent Laid-Open No. 06-137421).

SUMMARY OF THE INVENTION

According to the present invention, there is provided a speed reduction mechanism comprising: an input shaft; an output shaft arranged on the same axis as the input shaft; and a plurality of gears configured to transmit a driving force input to the input shaft to the output shaft, wherein the plurality of gears include an input gear provided on the input shaft, an output gear provided on the output shaft, and a plurality of transmission gears arranged in a circumferential direction of the input shaft.

Further features of the present invention will become apparent from the following description of exemplary embodiments (with reference to the attached drawings).

DESCRIPTION OF EMBODIMENTS

However, the power transmission efficiency of the hydro-static transmission (HST) is lower than that of a speed reduction mechanism using gears. On the other hand, as for the speed reduction mechanism using gears, to obtain a high reduction ratio in a situation in which the size in the radial direction is limited to apply the mechanism to, for example, travel driving of a working machine or the like, the number of stages of gears needs to be increased in the axial direction, and the mechanism becomes bulky in the axial direction. The size increase in the axial direction may be disadvantageous for the layout of the lower part of the vehicle body.

An embodiment of the present invention provides a speed reduction mechanism made compact in the axial direction using gears.

Figure 1:
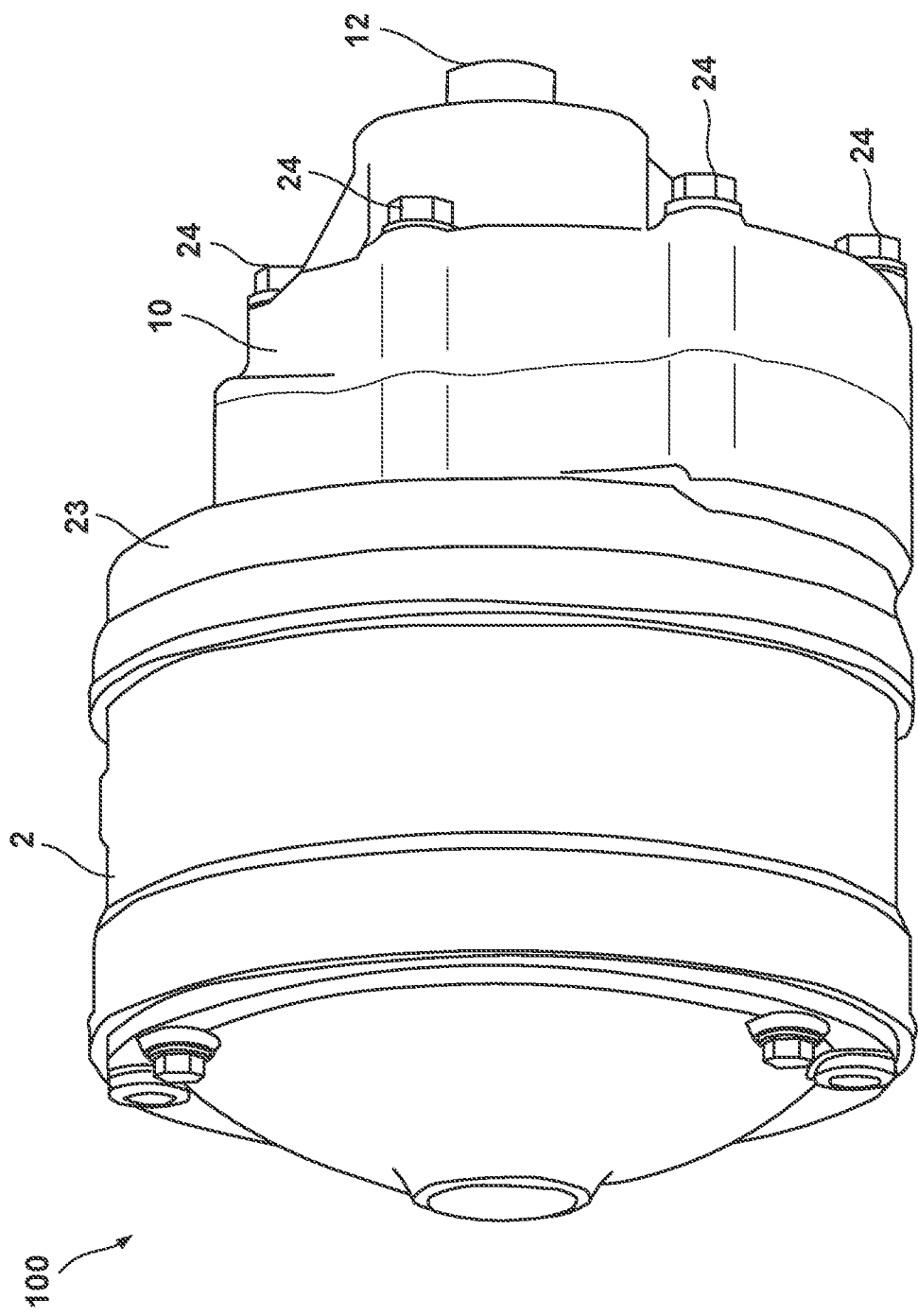
FIG. 1 is a view showing the outer appearance of a driving apparatus to which a speed reduction mechanism according to an embodiment is applied.

FIG. 1 is a view showing the outer appearance of a driving apparatus 100 to which a speed reduction mechanism 1 according to an embodiment is applied. The driving apparatus 100 according to this embodiment is used for, for example, travel driving of a working machine or the like. The outer shape of the driving apparatus 100 is formed by a speed reduction mechanism side housing 10 and a motor side housing 23. The speed reduction mechanism side housing 10 is fastened to the motor side housing 23 by, for example, a plurality of bolts 24. The driving apparatus 100 includes a motor 2 and the speed reduction mechanism 1 in the speed reduction mechanism side housing 10 and the motor side housing 23. The speed reduction mechanism 1 includes an output shaft 12, and outputs a driving force generated by the motor 2.

Figure 2:
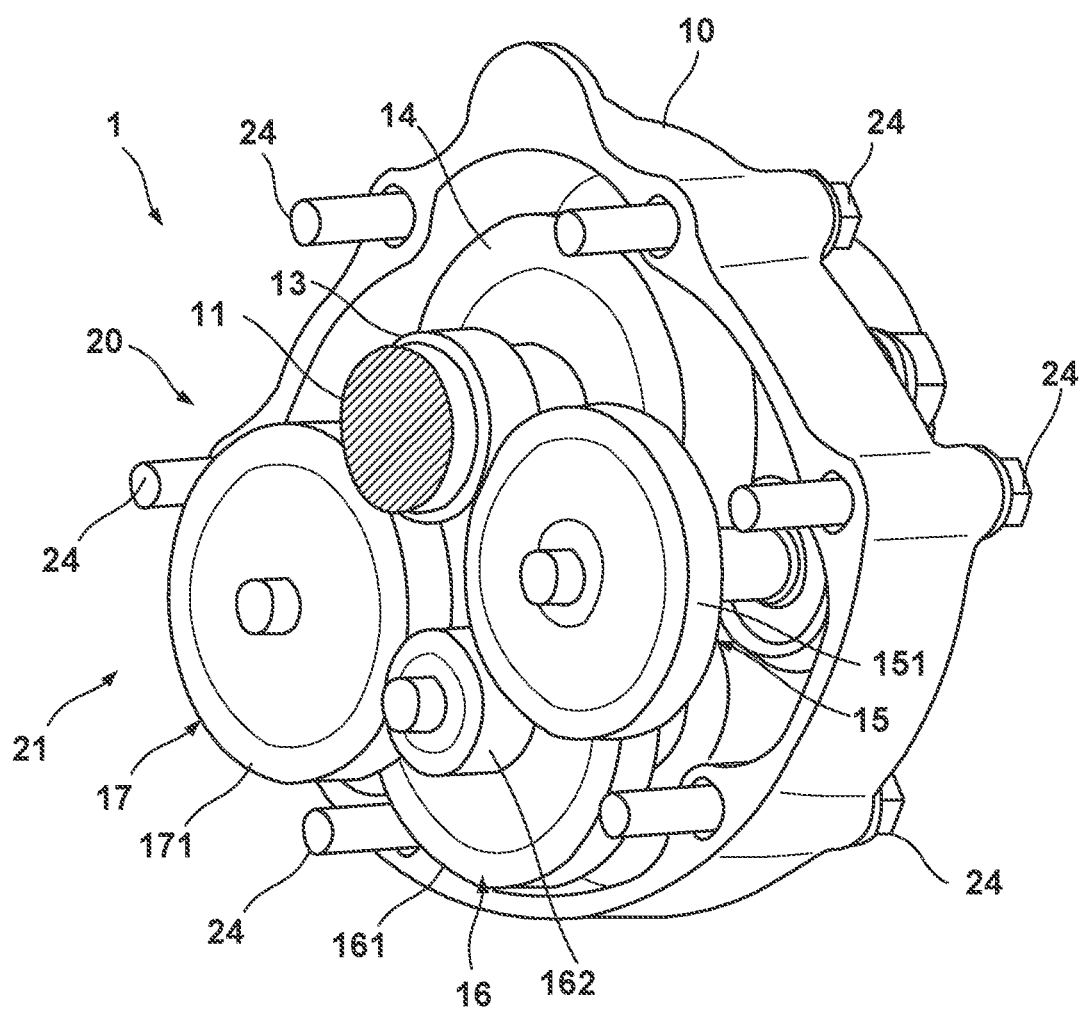
FIG. 2 is a perspective view showing the entire speed reduction mechanism according to the embodiment.

FIG. 2 is a perspective view showing the entire speed reduction mechanism 1. The speed reduction mechanism 1 includes an input shaft 11 and the output shaft 12. The driving force generated by the motor 2 is input to the input shaft 11 and output from the output shaft 12 after the rotation is decelerated by a plurality of gears 20. The plurality of gears 20 include an input gear 13 provided on the input shaft 11, an output gear 14 provided on the output shaft 12, and a plurality of transmission gears 21 configured to transmit the driving force input to the input shaft 11 to the output shaft 12. In this embodiment, each gear is a spur gear. Additionally, in this embodiment, the plurality of transmission gears 21 are formed by first, second, and third transmission gears 15, 16, and 17. Three transmission gears are provided, but the number of transmission gears may be two or four or more. The input gear 13 and the output gear 14 may be provided on the input shaft 11 and the output shaft 12, respectively, by integral molding, or may mechanically be joined by, for example, bolts, splines, or the like.

Figure 3A:
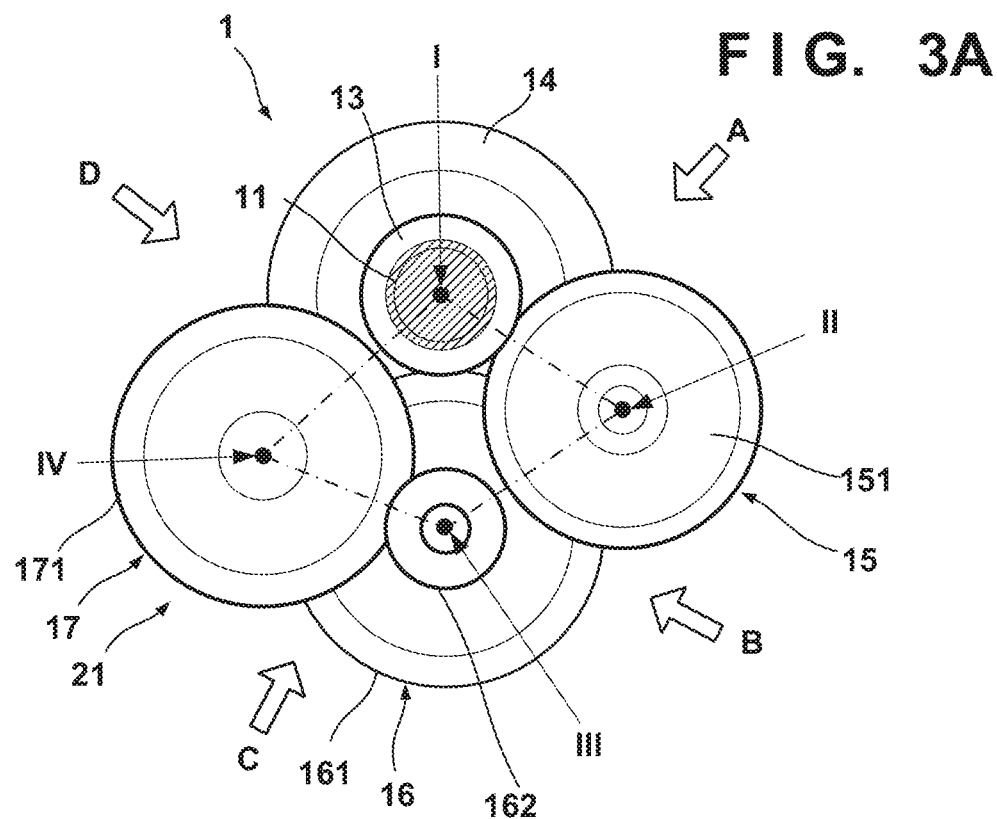
FIG. 3A is a view showing a plurality of gears viewed from the input shaft side.
Figure 3B:
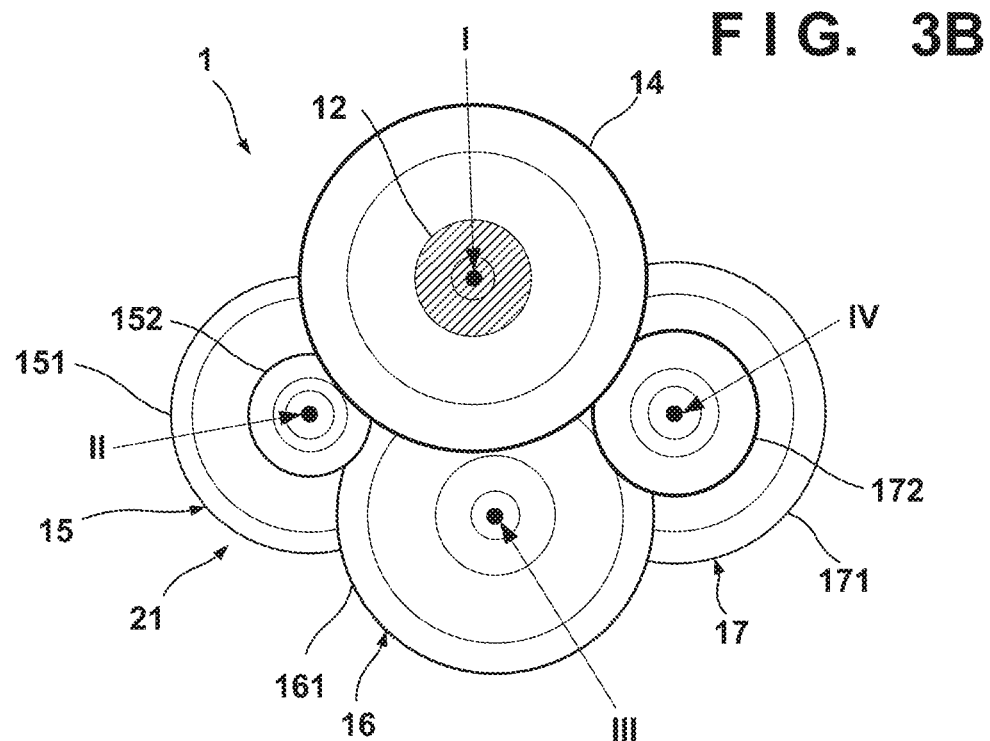
FIG. 3B is a view showing the plurality of gears viewed from the output shaft side.

FIGS. 3A and 3B will be referred to together with FIG. 2. FIG. 3A is a view showing the plurality of gears 20 viewed from the side of the input shaft 11, and FIG. 3B is a view showing the plurality of gears 20 viewed from the side of the output shaft 12. Points I, II, III, and IV in FIGS. 3A and 3B represent rotation axes. The input shaft 11 and the output shaft 12 are arranged on the same axis. The first, second, and third transmission gears 15, 16, and 17 are arranged side by side in the circumferential direction with respect to the input shaft 11 as the center. The driving force input to the input shaft 11 is transmitted to the output shaft 12 on the same axis as the input shaft 11 via the first, second, and third transmission gears 15, 16, and 17. The first, second, and third transmission gears 15, 16, and 17 may have rotation axes arranged on the same circumference with respect to the input shaft 11 as the center, or may have rotation axes deviated from the same circumference. According to this embodiment, since the plurality of transmission gears 21 are arranged side by side in the circumferential direction, the speed reduction mechanism 1 can be made compact in the axial direction.

The first, second, and third transmission gears 15, 16, and 17 include first, second, and third large diameter gears 151, 161, and 171 and first, second, and third small diameter gears 152, 162, and 172, respectively, on the same axis. In this embodiment, the diameter of the input gear 13 is formed smaller than the diameter of the output gear 14. Here, the first and third transmission gears 15 and 17 include the first and third large diameter gears 151 and 171 on the side of the input shaft 11, and include the first and third small diameter gears 152 and 172 on the side of the output shaft 12. On the other hand, the second transmission gear 16 includes the second small diameter gear 162 on the side of the input shaft 11, and includes the second large diameter gear 161 on the side of the output shaft 12. That is, according to this embodiment, in the plurality of transmission gears 21, the adjacent transmission gears, the large diameter gears, and the small diameter gears are arranged alternately in the axial direction. Hence, the large diameter gears overlap in the axial direction, and the speed reduction mechanism 1 can be made compact in the radial direction.

Figure 4:
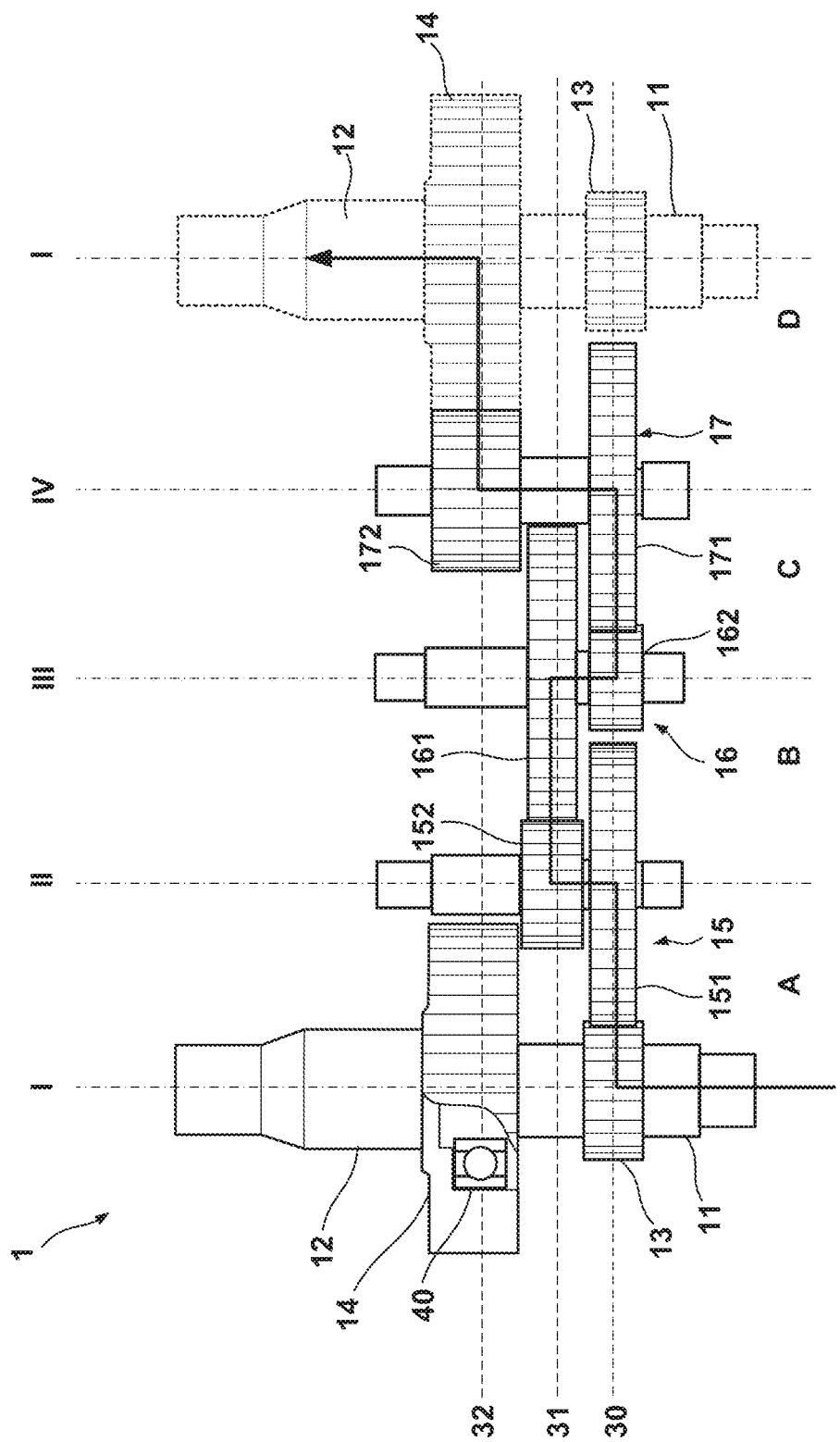
FIG. 4 is a view showing meshing of the plurality of gears and a power transmission path.

FIG. 4 will be referred to together with FIG. 3. FIG. 4 is a view showing meshing of the plurality of gears 20, and shows, in a planar view, a state viewed from directions A, B, C, and D in FIG. 3A. An arrow in FIG. 4 indicates the transmission path of the driving force.

The input gear 13 meshes with the first large diameter gear 151, and the driving force is transmitted from the input shaft 11 to the first transmission gear 15. The first small diameter gear 152 meshes with the second large diameter gear 161, and the driving force is transmitted from the first transmission gear 15 to the second transmission gear 16. The second small diameter gear 162 meshes with the third large diameter gear 171, and the driving force is transmitted from the second transmission gear 16 to the third transmission gear 17. The third small diameter gear 172 meshes with the output gear 14, and the driving force is transmitted from the third transmission gear 17 to the output shaft 12. Here, the output shaft 12 is rotatably supported by the input shaft 11 via a bearing 40 and arranged on the same axis as the input shaft 11.

The input gear 13, the first large diameter gear 151, the second small diameter gear 162, and the third large diameter gear 171 are arranged on a first layer 30 at the same position with respect to the axial direction, as indicated by a broken line in FIG. 4. Similarly, the first small diameter gear 152 and the second large diameter gear 161 are arranged on the second layer, and the output shaft 12 and the third small diameter gear 172 are arranged on the third layer.

As described above, according to this embodiment, the transmission gears adjacent to each other are configured such that the adjacent transmission gears, the large diameter gears, and the small diameter gears are arranged alternately in the axial direction, and the large diameter gear of one transmission gear and the small diameter gear of the other transmission gear mesh with each other. For this reason, as indicated by the arrow in FIG. 4, the power transmission path reciprocates in the axial direction between the first layer and the second layer. Hence, the speed reduction mechanism 1 can be made more compact in the axial direction. In addition, since the input gear 13 with a small diameter and the first large diameter gear 151 mesh with each other, and the output gear 14 with a large diameter and the third small diameter gear 172 mesh with each other, the center distance between the input/output shaft and the first and second transmission gears 15 and 16 is short, and the speed reduction mechanism 1 can be made more compact in the radial direction.

Figure 5:
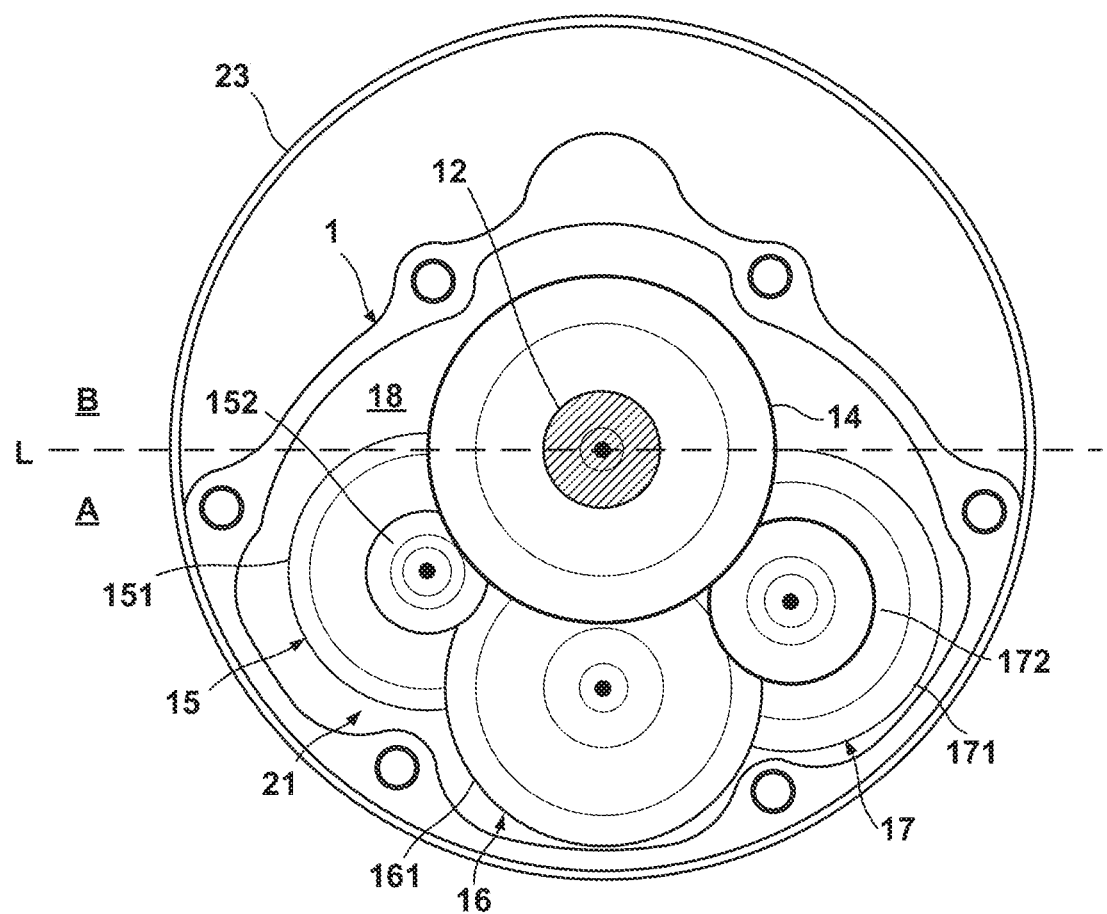
FIG. 5 is a view showing a state in which a speed reduction mechanism side housing is detached from the driving apparatus shown in FIG. 1, which is viewed from the output shaft side.

FIG. 5 is a view showing a state in which the speed reduction mechanism side housing 10 is detached from the driving apparatus 100 shown in FIG. 1, which is viewed from the output shaft side. In this embodiment, the rotation centers of the first, second, and third transmission gears 15, 16, and 17 are arranged in one virtual plane A of virtual planes A and B in the radial direction which are divided into two planes by a virtual line L serving as a boundary in the radial direction passing through the rotation center of the input shaft 11. Additionally, in this embodiment, the virtual plane A is provided on the lower side of the rotation center of the input shaft 11 in the drawing. In this embodiment, in the use state of the speed reduction mechanism 1, the speed reduction mechanism 1 is arranged such that its vertical direction matches the vertical direction in FIG. 5, that is, the virtual plane A is provided on the lower side of the rotation center of the input shaft 11. Note that when arranging the speed reduction mechanism 1, the virtual plane A may be provided such that at least a part of the virtual plane A is located on the lower side of the rotation center of the input shaft 11, and the virtual plane A may be provided such that it is located on the upper side of the rotation axis of the input shaft 11.

Here, the speed reduction mechanism 1 is provided in a space 18 formed by the motor side housing 23 and the speed reduction mechanism side housing 10. When the gears rotate in a state in which lubricant oil is stored in the space 18, the lubricant oil is drawn up to make lubrication. The height of the oil surface of the lubricant oil may match, for example, the virtual line L, or may be lower or higher than the virtual line L.

According to this embodiment, the rotation centers of the plurality of transmission gears 21 are located on one side (virtual plane A) of the virtual line L serving as a boundary in the radial direction passing through the input shaft 11. Hence, lubricating properties can be improved using a small amount of lubricant oil as compared to a case in which the rotation centers of the plurality of transmission gears 21 are arranged across the virtual planes A and B. Additionally, according to this embodiment, the rotation axes of the first, second, and third transmission gears 15, 16, and 17 are arranged collectively on the lower side of the input shaft 11. Hence, the lubricant oil can easily be stirred, and the lubricating properties can further be improved.

Summary of Embodiment

1. According to the above-described embodiment, there is provided a speed reduction mechanism comprising:
an input shaft (for example, 11);
an output shaft (for example, 12) arranged on the same axis as the input shaft; and
a plurality of gears (for example, 20) configured to transmit a driving force input to the input shaft to the output shaft,
wherein the plurality of gears include an input gear (for example, 13) provided on the input shaft, an output gear (for example, 14) provided on the output shaft, and a plurality of transmission gears (for example, 21) arranged side by side in a circumferential direction of the input shaft.

According to this embodiment, since the plurality of transmission gears are arranged side by side in the circumferential direction, the speed reduction mechanism can be made compact in the axial direction.

2. According to the above-described embodiment,
a rotation center of each of the plurality of transmission gears is located on one side of virtual planes in a radial direction, which are divided into two planes by a virtual line in the radial direction passing through a rotation center of the input shaft.

According to this embodiment, lubricating properties can be improved using a small amount of lubricant oil as compared to a case in which the plurality of gears are arranged on both of the two divided virtual planes.

3. According to the above-described embodiment, the one side is provided on a lower side of the input shaft in a use state.

According to this embodiment, the lubricant oil can easily be stirred, and the lubricating properties can further be improved.

4. According to the above-described embodiment, the plurality of gears comprise spur gears, and each of the plurality of transmission gears includes a large diameter gear (for example, 151, 161, 171) and a small diameter gear (for example, 152, 162, 172) on the same axis, and the large diameter gears and the small diameter gears of adjacent transmission gears are alternately arranged in an axial direction.

According to this embodiment, since the large diameter gears and the small diameter gears of adjacent transmission gears are arranged alternately in the axial direction, the large diameter gears overlap in the axial direction, and the speed reduction mechanism can be made compact in the radial direction.

5. According to the above-described embodiment, in the adjacent transmission gears, the large diameter gear of one transmission gear and the small diameter gear of the other transmission gear mesh with each other.

According to this embodiment, in the adjacent transmission gears, the large diameter gear of one transmission gear and the small diameter gear of the other transmission gear mesh with each other. For this reason, the power transmission path reciprocates in the axial direction, and the speed reduction mechanism can be made more compact in the axial direction.

6. According to the above-described embodiment, the input gear has a diameter smaller than a diameter of the output gear, the input gear meshes with the large diameter gear of the transmission gear, the output gear meshes with the small diameter gear of the transmission gear different from the transmission gear that meshes with the input gear in the plurality of transmission gears.

According to this embodiment, since the input gear with a small diameter and the large diameter gear mesh with each other, and the output gear with a large diameter and the output gear mesh with each other, the distance between the input and output shafts and the transmission gears is short. Hence, the speed reduction mechanism can be made more compact in the radial direction.

The present invention is not limited to the above embodiments, and various changes and modifications can be made within the spirit and scope of the present invention. Therefore, to apprise the public of the scope of the present invention, the following claims are made.

What is claimed is:

1. A speed reduction mechanism comprising:
an input shaft;
an output shaft arranged on the same axis as the input shaft; and
a plurality of gears configured to transmit a driving force input to the input shaft to the output shaft,
wherein the plurality of gears include an input gear provided on the input shaft, an output gear provided on the output shaft, and a plurality of transmission gears arranged side by side in a circumferential direction of the input shaft,
wherein the plurality of gears are spur gears,
wherein each of the plurality of transmission gears includes a large diameter gear and a small diameter gear on the same axis, and the large diameter gears and the small diameter gears of adjacent transmission gears are alternately arranged in an axial direction,
wherein the input gear has a diameter smaller than a diameter of the output gear,
wherein the input gear meshes with a large diameter gear of a first transmission gear included in the plurality of transmission gears,
wherein a small diameter gear of the first transmission gear meshes with a large diameter gear of a second transmission gear included in the plurality of transmission gears, and
wherein the input gear, the large diameter gear of the first transmission gear, and a small diameter gear of the second transmission gear are arranged at the same position with respect to the axial direction.

2. The speed reduction mechanism according to claim 1, wherein a rotation center of each of the plurality of transmission gears is located on one side of virtual planes in a radial direction, which are divided into two planes by a virtual line in the radial direction passing through a rotation center of the input shaft.

3. The speed reduction mechanism according to claim 2, wherein the one side is provided on a lower side of the input shaft in a use state.

4. The speed reduction mechanism according to claim 1, wherein, in the adjacent transmission gears, the large diameter gear of one transmission gear and the small diameter gear of another transmission gear mesh with each other.

5. The speed reduction mechanism according to claim 4, wherein the output gear meshes with a small diameter gear of a third transmission gear included in the plurality of transmission gears different from the first transmission gear and the second transmission gear.

\* \* \* \* \*